US012595917B2

(12) United States Patent
Kim et al.

(10) Patent No.: US 12,595,917 B2
(45) Date of Patent: Apr. 7, 2026

(54) CONTROL UNIT AND COOKING APPLIANCE INCLUDING THE SAME

(71) Applicant: LG ELECTRONICS INC., Seoul (KR)

(72) Inventors: Sungkyung Kim, Seoul (KR); Sanghun Kim, Seoul (KR); Hanjin Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 18/524,200

(22) Filed: Nov. 30, 2023

(65) Prior Publication Data

US 2025/0012453 A1 Jan. 9, 2025

(30) Foreign Application Priority Data

Jul. 7, 2023 (KR) ........................ 10-2023-0088547

(51) Int. Cl.
*F24C 15/00* (2006.01)
*G05G 1/10* (2006.01)

(52) U.S. Cl.
CPC ............... *F24C 15/00* (2013.01); *G05G 1/10* (2013.01)

(58) Field of Classification Search
None
See application file for complete search history.

(56) References Cited

U.S. PATENT DOCUMENTS 3,916,721 A * 11/1975 Egger ...................... G05G 1/10 188/74
11,788,730 B2 * 10/2023 Daufenbach ............ F24C 3/126 126/1 R
2009/0044381 A1 * 2/2009 Sellecchia ................ G05G 1/10 74/553

FOREIGN PATENT DOCUMENTS

EP 3 035 146 6/2016
KR 10-1710402 2/2017

* cited by examiner

*Primary Examiner* — Vicky A Johnson
(74) *Attorney, Agent, or Firm* — KED & ASSOCIATES

(57) ABSTRACT

A control unit for a cooking appliance including a base configured to be coupled to a cooking appliance, a knob rotatably disposed at the base, and a cover ring coupled to the base to surround the base. The cover ring may be mounted on the base by rotating the cover ring in a first direction with respect to the base, and removed from the base by rotating the cover ring in a second direction, which is an opposite direction to the first direction.

17 Claims, 12 Drawing Sheets

FIG. 12

CONTROL UNIT AND COOKING APPLIANCE INCLUDING THE SAME

CROSS-REFERENCE TO RELATED APPLICATION(S)

This application claims priority to and benefit of Korean Patent Application No. 10-2023-0088547, filed in Korea on Jul. 7, 2023, which is hereby incorporated by reference as if fully set forth herein.

BACKGROUND

1. Field

A control unit and a cooking appliance including a control unit are disclosed herein.

2. Background

Details in the background section do not constitute a prior art but are given only as background information concerning the subject matter.

Recently, a cooking appliance for cooking a food item or other items (hereinafter, collectively "food item"), used at home, has a structure in which various types of heating devices are provided for use. For example, a cooktop provided with heating devices is disposed on an upper surface of a cooking appliance, and a cavity accommodating a food item to be cooked is provided under the cooktop. The cooktop is provided with a plurality of various types of heating devices, such as a gas-type one, a heat transfer-type one, or an induction heating-type one, for example.

Additionally, for example, a heat transfer-type heating device and a microwave-type heating device are provided in the cavity at the same time. Users may select one of them for use or use them at the same time.

As a plurality of different types of heating devices is used for a cooking appliance, a control device for controlling each heating device is needed, and the control device, for example, can be provided as a control unit. As a related art, a cooking appliance with a control unit is disclosed in European Patent No. 3035146 A2 and Korean Patent No. 10-1710402, which are hereby incorporated by reference.

The control unit is provided in such a way that users hold and rotate the control unit to control operations of a plurality of heating devices provided in the cooking appliance. A cooking appliance with a plurality of heating devices operating independently is provided with a plurality of control units that controls an operation of each of the plurality of heating devices.

The control units may be detachably provided in the cooking appliance, for maintenance, or repairs, for example, of the cooking appliance. For example, in the case where the control unit needs to be repaired because of an operational error of the control unit, the control unit may be detached.

Additionally, each of the control units may have a different color to enhance ornamental aesthetic qualities. Users may separate components of a control unit to change the color of the control unit.

Further, foreign substances, such as oil, for example, that are generated from a food item being cooked at the cooktop may fall toward the control units from the cooktop. To clean the foreign substances, components of the control units may be separated from each other.

Ordinarily, a control unit is coupled to the cooking appliance by a coupling tool, such as a screw nail, for example. Accordingly, the user uses a tool, such as a driver, for example, to separate the control unit from the cooking appliance.

When an additional tool is used to separate the control unit from the cooking appliance and then separate components of the control unit respectively, it causes inconvenience to the user. Further, in a case in which the user unfamiliar with maintenance and repairs of the cooking appliance uses an additional tool to separate the control unit, the control unit and the cooking appliance may be damaged.

Under these circumstances, a control unit and a cooking appliance having a structure that is readily assembled by users without an additional tool needs to be designed.

BRIEF DESCRIPTION OF THE DRAWINGS

Embodiments will be described in detail with reference to the following drawings in which like reference numerals refer to like elements, and wherein.

DETAILED DESCRIPTION

Figure 1:
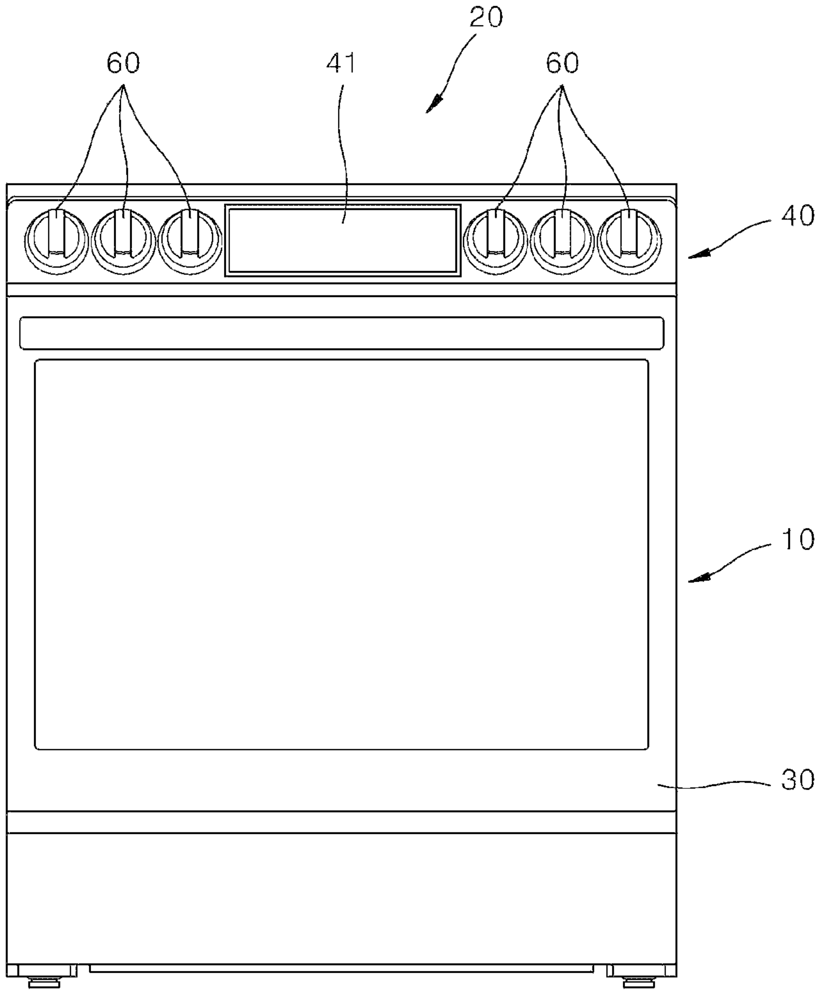
FIG. 1 is a view of a cooking appliance according to an embodiment.

Aspects, features and advantages are specifically described hereinafter with reference to accompanying drawings such that one having ordinary skill in the art to which the subject matter pertains may embody the technical spirit easily. Herein, description of known technologies in relation to the subject matter is omitted if it is deemed to make the gist unnecessarily vague. Hereinafter, embodiments are specifically described with reference to the accompanying drawings. In the drawings, identical reference numerals can denote identical or similar components.

The terms "first", "second" and the like are used herein only to distinguish one component from another component. Thus, the components are not to be limited by the terms. Certainly, a first component can be a second component, unless stated to the contrary.

Throughout this disclosure, each component can be provided a single one or a plurality of ones, unless stated to the contrary.

In this disclosure, singular forms include plural forms as well, unless explicitly indicated otherwise. In this disclosure, the terms "comprise", "being comprised of" and the like do not imply necessarily including stated components or stated steps and imply excluding some of the stated components or stated steps or including additional components or additional steps.

Throughout this disclosure, the terms "A and/or B" as used herein can denote A, B or A and B, and the terms "C to D" can denote C or greater and D or less, unless stated to the contrary.

Throughout this disclosure, an "upward-downward direction" denotes the up-down direction of a cooking appliance in the state where the cooking appliance is installed to be used as usual. A "leftward-rightward direction" denotes a direction across the upward-downward direction, and a frontward-rearward direction denotes a direction across both the upward-downward direction and the leftward-rightward direction. "Both lateral directions" or a "lateral direction" have the same meaning as the leftward-rightward direction, and the terms are used in a mixed manner.

Figure 2:
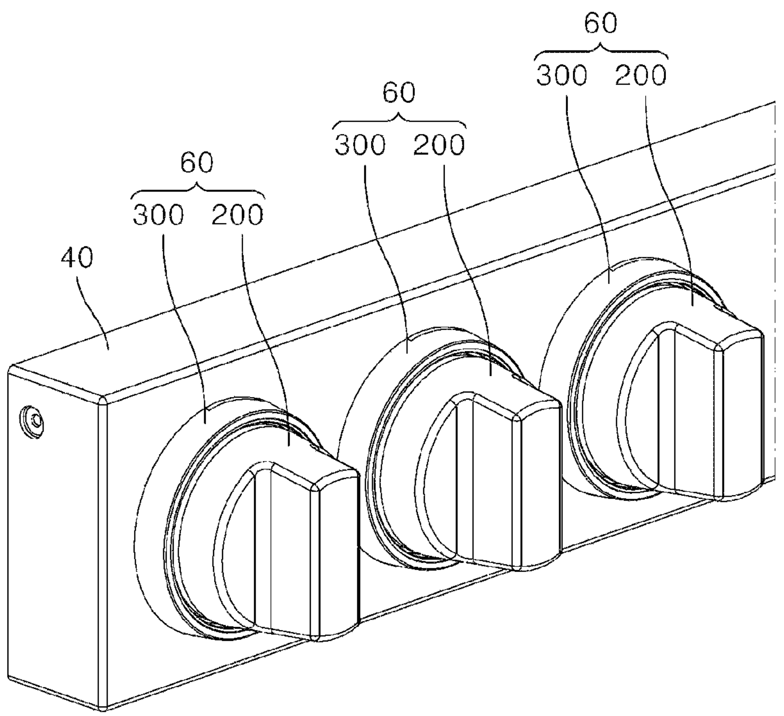
FIG. 2 is a view of a control unit according to an embodiment mounted on a cooking appliance.

FIG. 1 is a view of a cooking appliance according to one embodiment. FIG. 2 is a view of a control unit according to embodiment is mounted on a cooking appliance, and FIG. 3 is a view of the control unit of FIG. 2 with knobs separated therefrom.

Figure 3:
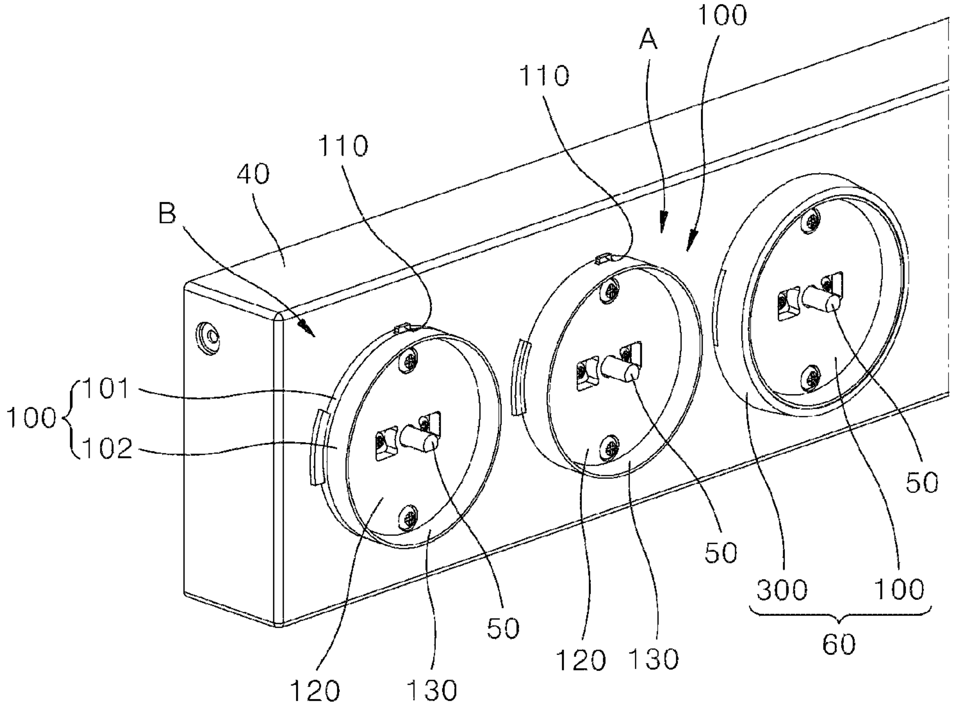
FIG. 3 is a view of the control unit of FIG. 2 with knobs separated therefrom.

In FIG. 3, A and B indicate a control unit 60 from which a cover ring 300 is separated. Additionally, A indicates a control unit 60 in the embodiment of FIG. 6, and B indicates a control unit 60 in the embodiment of FIGS. 15 and 16.

The control unit 60 according to one embodiment may be provided with one base 100 that is integrally formed, and the control unit 60 according to another embodiment may be provided with a base 100 in which a plurality of pieces, for example, a first piece 101 and a second piece 102, are manufactured and coupled. Each embodiment is specifically described, hereinafter.

For clear description, control units 60 of different embodiments are illustrated in FIG. 3; however, embodiments are not limited thereto. That is, a control unit 60 of the same embodiment may be provided for the same cooking appliance, and a control unit 60 of a different embodiment may be provided for the same cooking appliance in a mixed manner.

The cooking appliance according to one embodiment may be provided with a heating device base on a variety of methods, such as gas, heat transfer, electric induction, or microwaves, for example. A plurality of heating devices may be provided, and each of the plurality of heating devices may be provided in a different way.

The cooking appliance according to one embodiment may include a cavity 10, a cooktop 20, a door 30, a control panel 40, a rotational shaft 50, and a control unit 60. The cavity 10 is a space that is surrounded and formed by an outer wall forming an outer shape of the cooking appliance, and accommodates a food item to be cooked.

The cooktop 20 may be provided on an upper surface of the cooking appliance, and provided with a plurality of heating devices, and each of the heating devices may be provided as a heat source based on a same method or a different method. Thus, a container containing a food item may be placed on the cooktop 20, and the food item may be heated and cooked at the cooktop 20.

The door 30 may be disposed at a front of the cavity 10 and open and close the cavity 10. The control panel 40 may be disposed at an upper side of the door 30, that is, in an upper portion of the cooking appliance, and the control unit 60 that controls an operation of the cooking appliance may be mounted on the control panel 40.

A display 41 may be provided at the control panel 40. The display 41 may display information on an operation of the cooking appliance as characters or numbers.

The rotational shaft 50 may protrude by passing through the control panel 40. The rotational shaft 50 may manipulate a control device disposed in the cooking appliance. Accordingly, as the rotational shaft 50 rotates, the control device connected to the rotational shaft 50 may be manipulated to control an operation of the cooking appliance.

A plurality of control units 60 may be provided, and a number of control units 60 may be the same as the number of the heating devices connected to the control unit 60.

The control unit 60 may be provided on the control panel 40. The control unit 60 may be disposed on the control panel 40 by being connected to the rotational shaft 50. The user rotates the control unit 60, and accordingly, the rotational shaft 50 connected to the control unit 60 rotates to control an operation of the cooking appliance.

The user may turn on/off each heating device by rotating the control unit 60, or adjust a firepower of each heating device. Additionally, a certain control unit 60 may be used to control an operation time of the heating device.

As the cooking appliance is provided with a plurality of heating devices, to control the plurality of heating devices independently and respectively, a plurality of control units 60 and a plurality of rotational shafts 50 may be provided. In this embodiment, a total of 6 control units 60 is provided, but the number of control units 60 is not limited.

Figure 4:
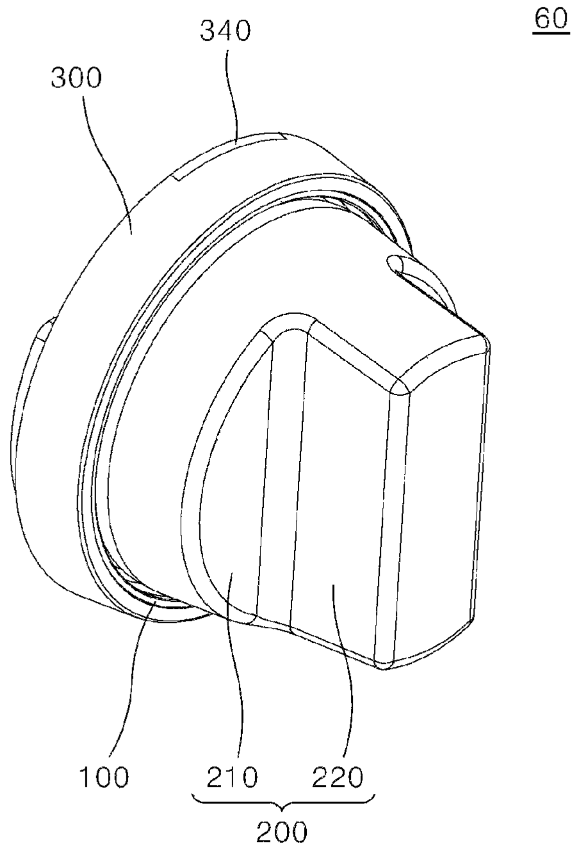
FIG. 4 is a perspective view of a control unit according to an embodiment.
Figure 5:
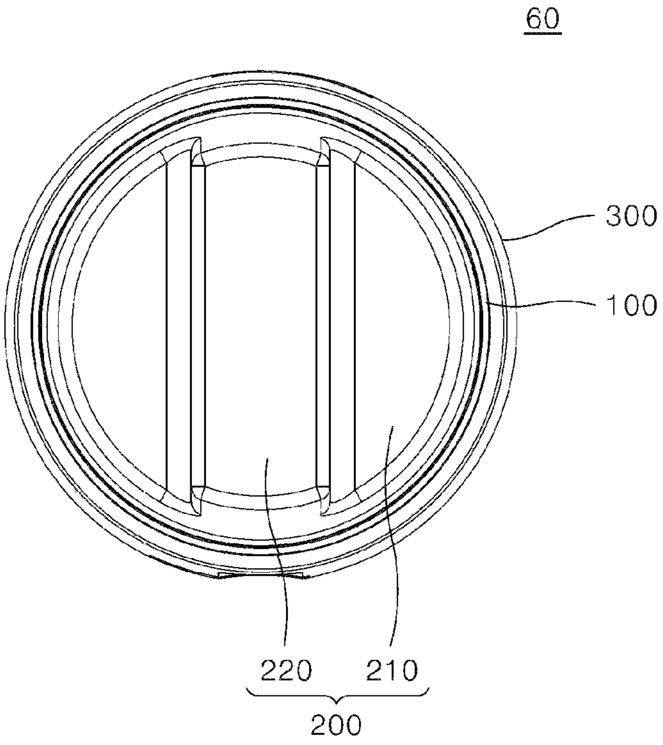
FIG. 5 is a front view of the control unit of FIG. 4.
Figure 6:
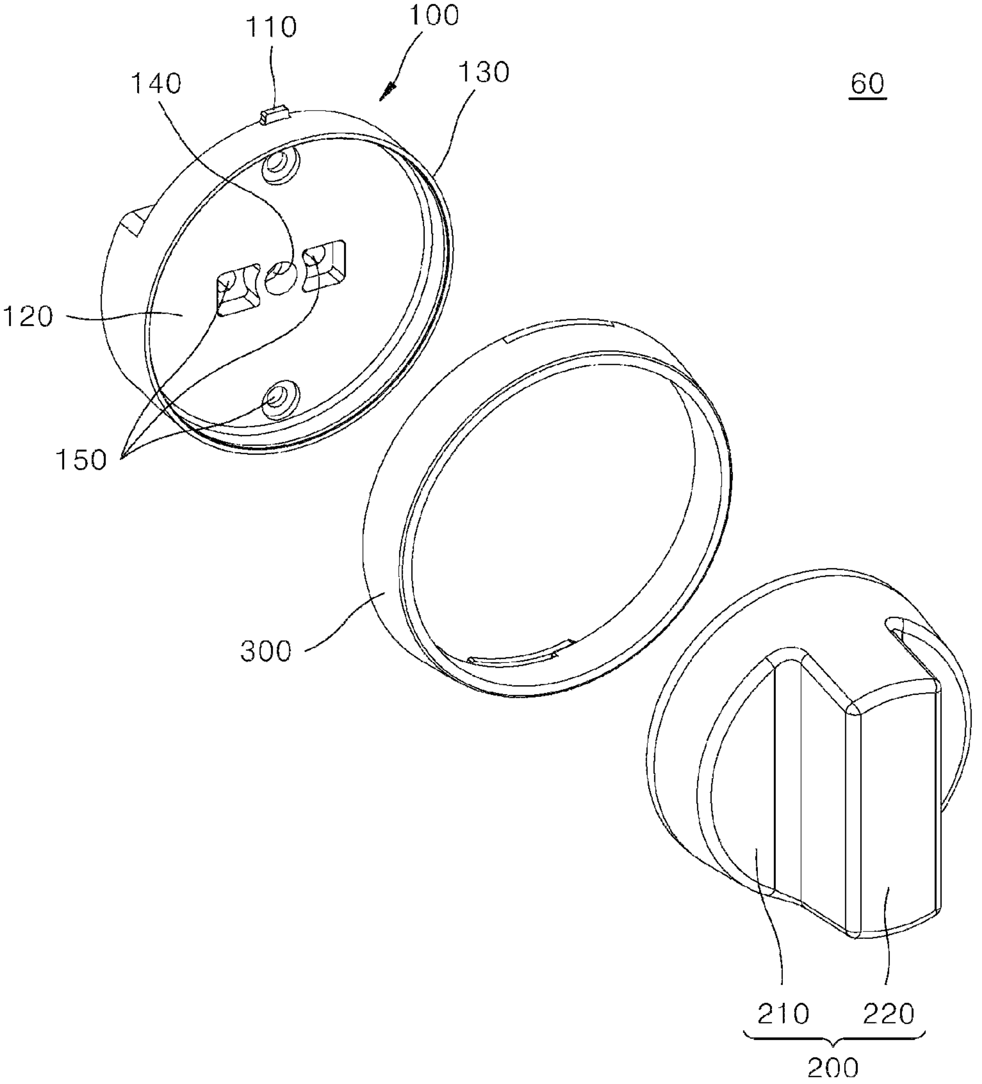
FIG. 6 is an exploded view of the control unit according to an embodiment.

FIG. 4 is a perspective view of the control unit according to an embodiment. FIG. 5 is a front view of the control unit of FIG. 4. FIG. 6 is an exploded view showing the control unit according to an embodiment.

The control unit 60 according to an embodiment is provided at the cooking appliance, and used to control an operation of the cooking appliance. The user may control the heating devices provided at the cooking appliance by rotating the control unit 60.

The control unit 60 may include a base 100, a knob 200, and a cover ring 300. The base 100 may be coupled to the cooking appliance. The base 100 may be mounted on the control panel 40 by a coupling tool, such as a screw nail, for example.

An LED module may be coupled to a rear surface of the base 100, that is, a surface on an opposite side of the knob 200. The LED module may radiate light toward the base 100. The base 100 may be made of a transparent or translucent material to allow light radiated from the LED module to penetrate.

The base 100 may act as a light guide plate that diffuses light radiated from the LED module, while the light passes through the light guide plate. Accordingly, the base 100 may shine as a hole, and the control unit 60 provides ornamental aesthetic qualities for the user because of the light emitted from the base 100, such that the user may check whether the cooking appliance operates.

The base 100 illustrated in FIG. 6 may be integrally manufactured. However, the base 100 according to another embodiment illustrated in FIG. 15 may be manufactured in such a way that a plurality of pieces are separated each other. For convenience of manufacturing, in a case in which the base 100 is formed completely in such a way that a plurality of pieces is manufactured and coupled, diffraction, refraction, and total reflection, for example, of light may occur on a boundary surface of each piece. Such light distortion leads to failure in uniform diffusion of light radiated from the LED module and a decrease in a brightness of light, at the base 100 where the plurality of pieces is coupled.

Additionally, as there is no factor causing diffraction, refraction, and total reflection, for example, of light in the base 100 manufactured integrally, light radiated from the LED module may be diffused uniformly, and the base 100 integrally manufactured ensures higher brightness of light than the base manufactured by using pieces. Thus, in the case of a base 100 manufactured integrally, light radiated from the LED module may be used more efficiently.

A front surface of the base 100 may face the knob 200, and have an approximately planar shape to allow the knob 200 to rotate smoothly. A rear surface of the base 100 may have a protruding portion that partially protrudes to mount at least a portion of the control device to which the rotational shaft 50 is coupled.

The knob 200 may be rotatably disposed at the base 100. The knob 200 may be inserted into the rotational shaft 50 and disposed at the base 100. The knob 200 may be provided in such a way that the user readily mounts the knob 200 on the rotational shaft 50 and removes the knob 200 from the rotational shaft 50.

The user rotates the rotational shaft 50 coupled to the knob 200 by rotating the knob 200 manually, to control an operation of the cooking appliance. The knob 200 may be provided to rotate with respect to the base 100 and the cover ring 300, and accordingly, may be provided in such a way that the knob 200 keeps separating from the base 100, such that the knob 200 may rotate even in a state in which the base 100, the knob 200 and the cover ring 300 are all assembled.

The knob 200 may include a body 210 and a handle 220. The body 210 and the handle 220 may be integrally formed. The knob 200 may be disposed inside of the cover ring 300 and surrounded by the cover ring 300.

The handle 220 may protrude from the body 210 and have a bar shape. The user rotates the knob 200 by holding the handle 220 and applying force, to manipulate the control device connected to the knob 200 and the rotational shaft 50.

The cover ring 300 may be coupled to the base 100 in such a way that the cover ring 300 surrounds the base 100. The cover ring 300 may be approximately shaped into a ring.

The cover ring 300 may be coupled to the base 100 to fill a gap between the base 100 and the knob 200. Foreign substances, such as oil, for example, generated during cooking of a food item placed on the cooktop 20 may fall down to the control unit 60 from the cooktop 20. The cover ring 300 may fill the gap between the base 100 and the knob 200 and suppress inflow of the foreign substances through the gap.

Further, in a case in which the control unit 60 needs to be repaired due to an operational error of the control unit 60, the user may separate the cover ring 300 from the base 100 to disassemble the control unit 60.

Furthermore, to distinguish the role of each control unit 60 and enhance ornamental and aesthetic qualities, each cover ring 300 of the plurality of control units 60 may have a different color. The color of each of the plurality of cover rings 300 may be replaced with another color, depending on a user's taste.

For this reason, a plurality of cover rings 300 of different colors may be provided to the user who purchases a cooking appliance. When necessary, the user may replace a cover ring 300 with a cover ring 300 having a different color.

For the above reasons, the user may often replace the cover ring 200. A structure in which the user readily attaches the cover ring 300 to the base 100 and detaches the cover ring 300 from the base 100 without an additional tool, such as a driver, for example, needs to be designed.

For the user to attach the cover ring 300 to the base 100 and detach the cover ring 300 from the base 100 without an additional tool, a structure is required in which the cover ring 300 may be mounted on the base 100 without a coupling tool, such as a screw nail, for example. Such a structure is described hereinafter.

The cover ring 300 is mounted on the base 100 by rotating in one or a first direction with respect to the base 100, and is removed from the base 100 by rotating in a second or the opposite direction. The user may readily attach the cover ring 300 to the base 100 and detach the cover ring 300 from the base 100 by rotating the cover ring 300 manually, without using an additional tool for attachment and detachment.

The cover ring 300 may be provided to be mounted on the base 100 and released from the base 100 in such a way that the cover ring 300 is independent from the knob 200. That is, the cover ring 300 may be disposed outside of the knob 200 and surround the knob 200. Accordingly, the cover ring 300 may be separated even in a state in which the knob 200 is coupled to the rotational shaft 50, without separating the knob 200 as the cover ring 300 is spaced from the knob 200.

With this structure, the user may readily attach the cover ring 200 to the base 100 and detach the cover ring 300 from the base 100 without separating the knob 200. Thus, the knob 200 may be readily attached to and detached from another portion of the control unit 60, providing convenience to the user.

Figure 7:
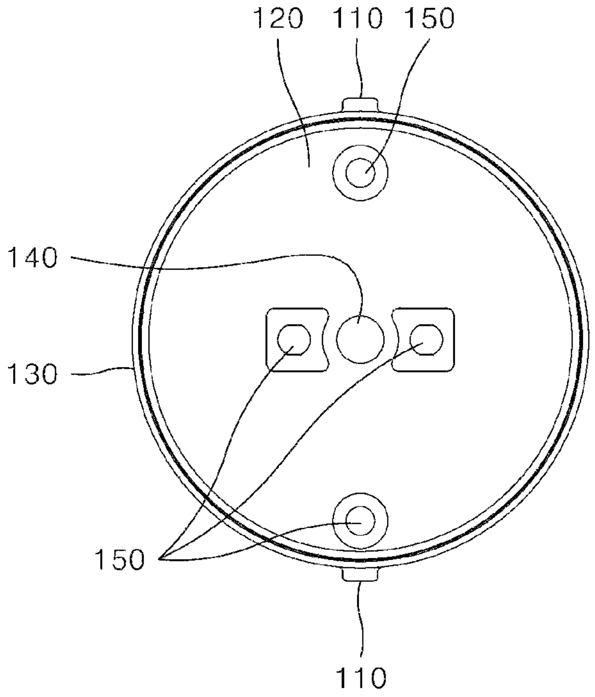
FIG. 7 is a front view showing a base according to an embodiment.
Figure 8:
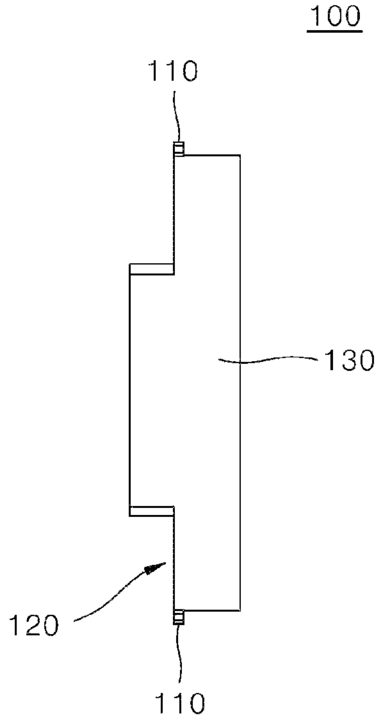
FIG. 8 is a side view of the base of FIG. 7.

FIG. 7 is a front view showing a base 100 according to an embodiment, and FIG. 8 is a side view of the base of FIG. 7. The base 100 may have at least one coupling protrusion 110 that protrudes outward from an edge of the base 100 and to which the cover ring 300 may be coupled.

The coupling protrusion 110 may be formed to protrude from the edge of the base 100 in a diameterwise direction of the base 100, and inserted into a first coupling groove 310 and a second coupling groove 320 formed at the cover ring 300 such that the cover ring 300 and the base 100 may be coupled to each other.

Additionally, the base 100 may comprise a first part or portion 120, a second part or portion 130, a shaft insertion hole 140 and a tool fastening hole 150. The first part 120 may be shaped into a disc, for example, and may be fixedly coupled to the control panel 40 by a coupling tool, such as a screw nail, for example.

The second part 130 may protrude from an edge of the first part 120, in the form of a ring and be surrounded by the cover ring 300, and be provided to surround at least a portion of the knob 200. An outer surface of the second part 130 may be provided to contact or face an inner surface of the cover ring 300, and guides the cover ring 300 such that the cover ring 300 rotates smoothly with respect to the base 100.

Further, an inner surface of the second part 130 may be provided to contact and face at least a portion of an outer surface of the body 210 of the knob 200, and guide the knob 200 reliably such that the knob 200 rotates without escaping from its position. Furthermore, the second part 130 may have a coupling protrusion 110, in a rear portion thereof.

The shaft insertion hole 140 may be formed in a central portion of the first part 120, and the rotational shaft 50 may be inserted into the shaft insertion hole 140. As the rotational shaft 50 needs to rotate smoothly with respect to the first part 120, a diameter of the shaft insertion hole 140 may be greater than a diameter of the rotational shaft 50.

A plurality of tool fastening holes 150 may be provided at a position spaced from the position of the shaft insertion hole 140, at the first part 120, and a fastening tool, such as a screw nail, for example, may be inserted into the tool fastening hole 150. A proper number of tool fastening holes 150 may be formed at proper positions such that the base 100 may be coupled to the control panel 40 reliably. As a fastening tool is coupled to the tool fastening hole 150, the entire control unit 60 including the base 100 may be mounted on the control panel 40.

Figure 9:
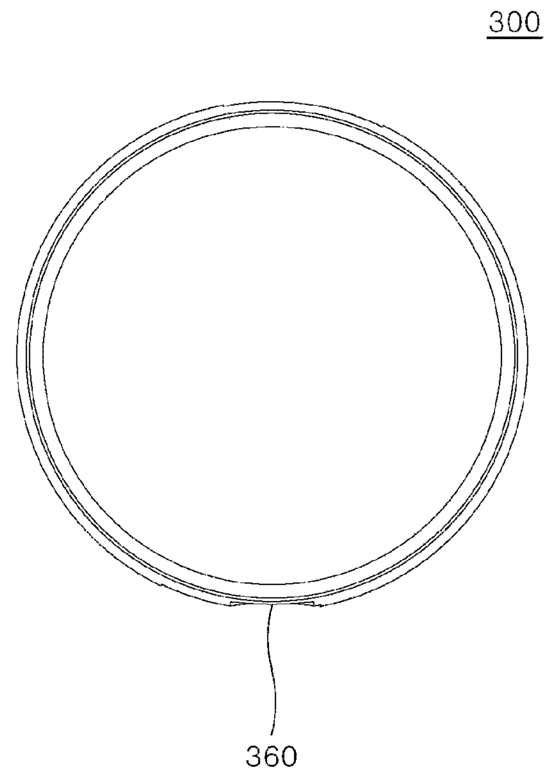
FIG. 9 is a front view showing a cover ring according to an embodiment.
Figure 10:
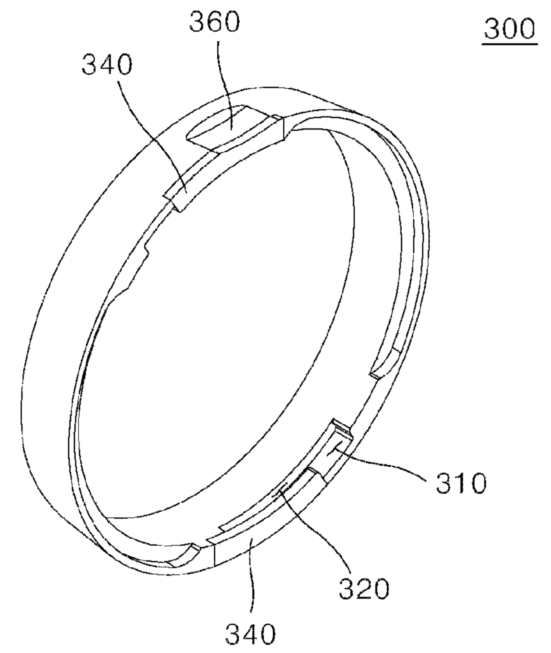
FIG. 10 is a perspective view of the cover ring of FIG. 9.
Figure 11:
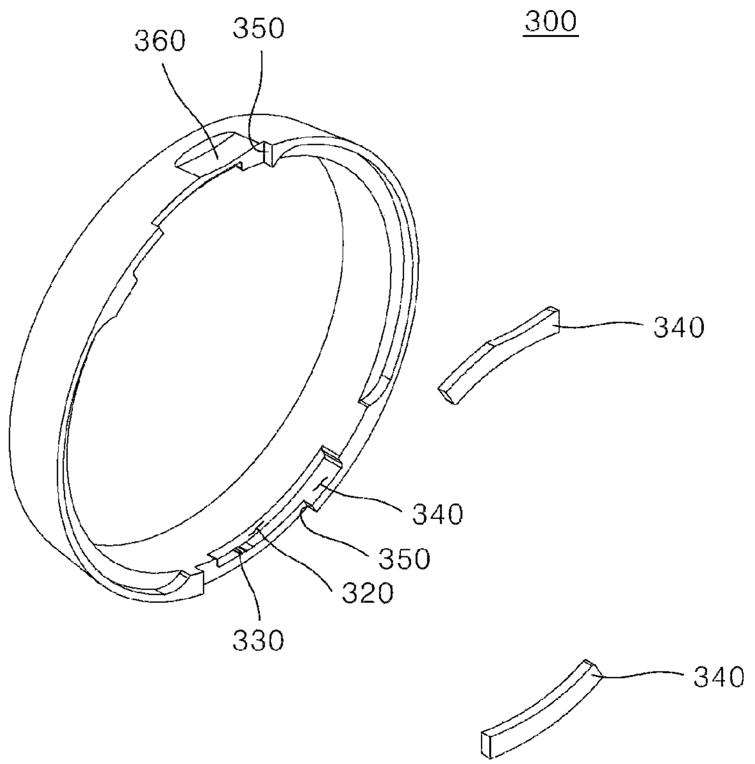
FIG. 11 is a view showing that a mounting piece separated from the cover ring in FIG. 10.
Figure 12:
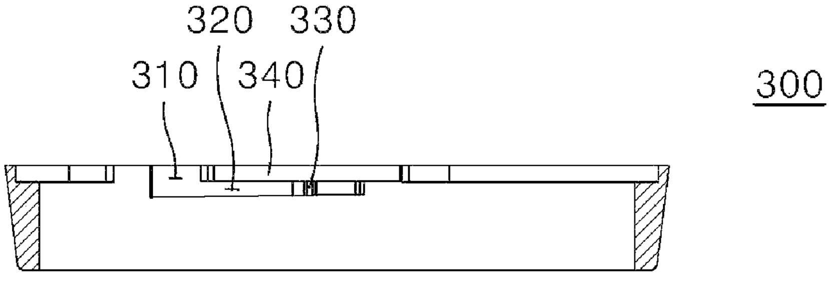
FIG. 12 is a cross-sectional view showing the cover ring according to an embodiment.

FIG. 9 is a front view showing a cover ring 300 according to an embodiment. FIG. 10 is a perspective view of the cover ring of FIG. 10. FIG. 11 is a view of a mounting piece 340 separated from the cover ring in FIG. 10, and FIG. 12 is a cross-sectional view of the cover ring according to an embodiment.

The cover ring 300 may include first coupling groove 310 and second coupling groove 320. The first coupling groove 310 may be formed on an inner wall of the cover ring 300 and have one open end, and the coupling protrusion 110 may be coupled to the first coupling groove 310. The coupling protrusion 110 comes through the one open end of the first coupling groove 310 such that the cover ring 300 and the base 100 may be coupled to each other.

The second coupling groove 320 may be formed on the inner wall of the cover ring 300 in such a way that the second coupling groove 320 connects to the first coupling groove 310, a lengthwise direction of the second coupling groove 320 may be disposed in a circumferential direction of the cover ring 300, and the coupling protrusion 110 may be coupled to the second coupling groove 320. As the cover ring 300 rotates, the coupling protrusion 110 may move along the second coupling groove 320.

The user may insert the coupling protrusion 110 into the first coupling groove 310 by pushing the cover ring 300 manually and allowing the coupling protrusion 110 of the base 100 to come into the first coupling groove 310 of the cover ring 300. Then the user rotates the cover ring 300 with respect to the base 100 manually such that the coupling protrusion 110 of the base 100 is guided by the second coupling groove 320 and moves into the second coupling groove 320, and as the coupling protrusion 110 contacts the closed end of an inner side of the second coupling groove 320, the cover ring 300 is not rotated any more and is coupled to the base 100 completely.

The coupling protrusion 110, and the first coupling groove 310 and the second coupling groove 320 corresponding to the coupling protrusion 110 may be respectively provided as a pair. In a case in which the base 100 has one coupling protrusion 110, a coupling may hardly be maintained reliably, and in a case in which the base 100 has three or more coupling protrusions 110, the use may hardly fit the cover ring 300 to the base 100. Considering this, a pair of coupling protrusions 110, that is, two coupling protrusions 110 are provided, and in response, a pair of first coupling grooves 310 and a pair of second coupling grooves 320 are provided properly.

Accordingly, a pair of coupling protrusion 110 may be provided in positions that are symmetrical to each other with respect to a center of the base 100. In other words, the coupling protrusion 110 may be disposed in positions that are opposite to each other, at an edge of the base 100, that is, in positions that are spaced from each other by 180° in the circumferential direction, at the edge of the base 100.

Additionally, a pair of the first coupling grooves 310 and a pair of the second coupling grooves 320 may be provided at each of the pair of coupling protrusions 110 in such a way that the first coupling grooves and the second coupling grooves respectively are disposed symmetrically with respect to a center of the cover ring. Accordingly, the first coupling grooves 310 and the second coupling grooves 320 may be respectively disposed at opposite positions of the cover ring 300, that is, positions that are spaced from each other by 180° in the circumferential direction of the cover ring 300.

The cover ring 300 may include a mounting piece 340, and a mounting groove 350. The mounting piece 340 may be mounted in a position at which the mounting piece 340 overlaps at least a portion of the second coupling groove 320 and cover the open portion of the second coupling groove 320. The mounting groove 350 may be formed in such a way that the mounting groove 350 is depressed in a position at which the mounting groove 350 overlaps at least a portion of the second coupling groove 320, and the mounting piece 340 may be mounted in the mounting groove 350.

The cover ring 300 may be made of a plastic material or an aluminum material that shows excellent corrosion resistance and is lightweight, for example. Regardless of a material for the cover ring 300, it may be difficult to form the second coupling groove 320 which is depressed and has both sides closed, on the inner surface of the cover ring 300, when it comes to processing. However, unlike the second coupling groove 320 formed as described above, a second coupling groove 320 one side of which is entirely open may be formed on the inner surface of the cover ring 300, ensuring ease of manufacturing and a reduction in manufacturing costs.

In this embodiment, the second coupling groove 320 may be manufactured on the inner surface of the cover ring 300, in such a way that one side of the second coupling groove 320 is totally open, and the open one side of the second coupling groove 320 may be covered by the mounting piece 340, and as a result, the second coupling groove 320, both sides of which are closed, may be formed on the inner surface of the cover ring 300.

Referring to FIG. 11, ends of the mounting piece 340 and the mounting groove 350 may be elongated further than the closed end of the second coupling groove 320 in the circumferential direction of the cover ring 300. With this structure, as the mounting piece 340 is mounted in the mounting groove 350 and is fixed to the cover ring 300, the open one side of the second coupling groove 320 may be closed completely.

Further, the mounting piece 340 may be firmly fixed to the cover ring 300, with an adhesive or based on heat compression, in the mounting groove 350. In the above-described structure, the second coupling groove 320 may be open in a direction in which the second coupling groove 320 faces a central portion of the cover ring 300 in the diameterwise direction of the cover ring 300, and may be closed in a direction across the diameterwise direction of the cover ring 300. The second coupling groove 320 may be open at a position in which the second coupling groove 320 meets the first coupling groove 310.

The cover ring 300 may include a guide groove 360. The guide groove 360 may be formed in such a way that the outer surface of the cover ring 300 is depressed, and in a case in which the user contacts the cover ring 300 may guide a rotational angle of the cover ring 300.

As the cover ring 300 is shaped into a ring, the user's hand may slip in a case in which the user holds and rotates the outer surface of the cover ring 300. To prevent this from happening, the guide groove 360 may be formed on the outer surface of the cover ring 300, such that the user holds the guide groove 360 with his or her fingers and rotates the cover ring 300, to rotate the cover ring 300 without a slip.

Additionally, the guide groove 360 may guide the rotational angle of the cover ring 300. That is, as the guide groove 360 rotates as the cover ring 300 rotates, the user may see a degree to which the cover ring 300 rotates by checking a position of the guide groove 360.

For example, in a case in which the cover ring 300 is mounted on the base 100 completely, the guide groove 360 may be disposed at a lowermost position of the cover ring 300. The lower most position of the cover ring 300 denotes a position at which the guide groove 360 is disposed at a lowermost position of the cover ring 300 in the case in which the cooking appliance is installed for use in a place in which the cooking appliance is usually used. For example, in a case in which the guide groove 360 is disposed at a position closest to the door 30, it may be considered that the guide groove 360 is disposed at the lowermost position of the cover ring 300. As the cover ring 300 is mounted on the base 100 completely, the guide groove 360 is placed at the lowermost position of the cover ring 300, such that the user determines whether the cover ring 300 is mounted completely by checking the position of the guide groove 360.

The user may determine whether the cover ring 300 is mounted on the base 100 completely by checking a height of the guide groove 360. Additionally, the user may determine whether the cover ring 300 is loose by checking the height of the guide groove 360 in a case in which the cover ring 300 is slightly loose with respect to the base 100 for some reason after the cover ring 300 is mounted completely, and rotate the cover ring 300 to some degree to firmly mount the cover ring 300 on the base 100 again.

Based on the above-described disposition position of the guide groove 360, the user may readily and visually determine whether the cover ring 300 is normally coupled to the base 100 completely.

Figure 13:
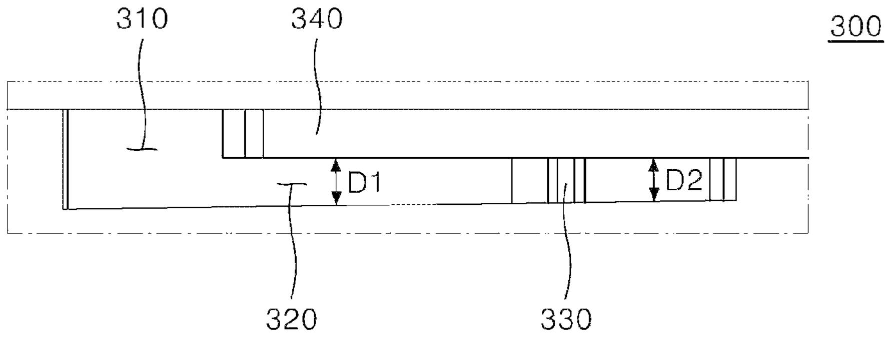
FIG. 13 is an enlarged view of a portion in FIG. 12.
Figure 14:
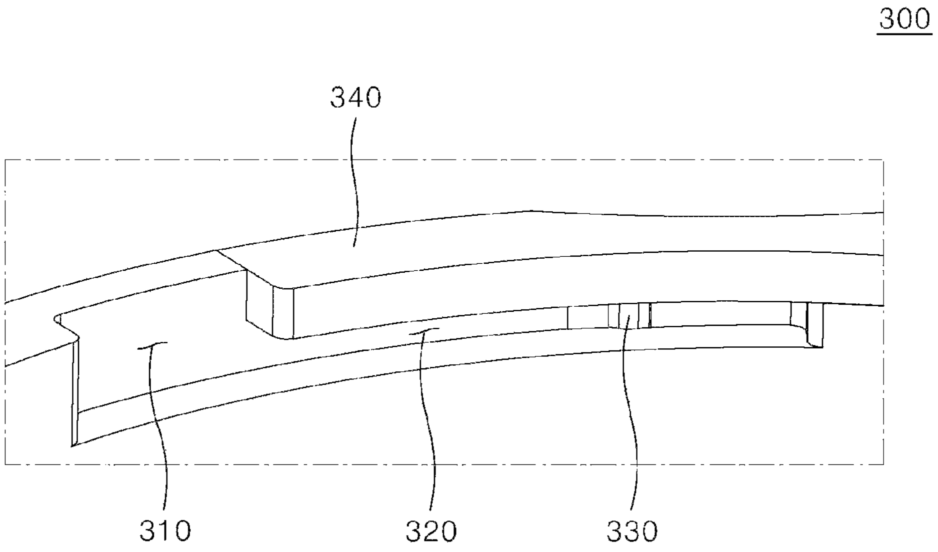
FIG. 14 is a perspective view of FIG. 13.

FIG. 13 is an enlarged view of a portion in FIG. 12. FIG. 14 is a perspective view of FIG. 13. The second coupling groove 320 may be formed to have a width that deceases gradually in a direction in which the second coupling groove 320 extends away from the first coupling rove 310. Referring to FIG. 13, a width D1 of the second coupling groove 320 at a position near the first coupling groove 310 may be greater than a width D2 of the second coupling groove 320 at a position far from the first coupling groove 310. That is, the width of the second coupling groove 320 may decrease gradually as the second coupling groove 320 extends away from the first coupling groove 310.

As the cover ring 300 is rotated in one direction, for example, clockwise, to couple the cover ring 300 to the base 100 firmly, the coupling protrusion 110 may move along the second coupling groove 320 in the direction in which the coupling protrusion 110 becomes far away from the first coupling groove 310. Accordingly, as the cover ring 300 rotates further clockwise, the width of the second coupling groove 320 decreases, and accordingly, the coupling protrusion 110 may be fitted into the second coupling groove 320 tightly, and in the case in which one side of the coupling protrusion 110 contacts the closed one end of the second coupling groove 320, and the cover ring 300 is mounted on the base 100 completely, the cover ring 300 may remain coupled to the base 100 firmly.

On the contrary, as the cover ring 300 is rotated in the other direction, for example, counterclockwise, to remove the cover ring 300 from the base 100, the coupling protrusion 110 may move along the second coupling groove 320 in a direction in which the coupling protrusion 110 becomes closer to the first coupling groove 310. As the width of the second coupling groove 320 increases as the cover ring 300 rotates further counterclockwise, the coupling protrusion 110 may be readily released from the restriction of the second coupling groove 320, and the cover ring 320 may be smoothly removed from the base 100.

The cover ring 300 may include a restriction projection 330. The restriction projection 330 may be formed at a position of the cover ring 300, where the second coupling groove 320 is formed, in such a way that the restriction projection 330 protrudes from the inner wall of the cover ring 300, and may suppress movement of the coupling protrusion 110 from the second coupling groove 320. The restriction projection 330 may protrude at the second coupling groove 320 toward the diameterwise direction of the cover ring 300, and may be disposed closer to the closed end of the second coupling groove 320 than to the open end of the second coupling groove 320, which connects to the first coupling groove 310.

As the cover ring 300 is fitted to the base 100 and rotated clockwise, one side of the coupling protrusion 110 may move along the second coupling groove 320 and then contact the restriction projection 330 protruding and stop rotating. At this time, the user rotates the cover ring 300 by applying a rotational force of a predetermined magnitude or greater, and accordingly, at least any one of the coupling protrusion 110 or the restriction projection 330 is elastically deformed, and the coupling protrusion 110 passes through the restriction projection 330 and contacts the closed one end of the second coupling groove 320, such that the cover ring 300 is mounted on the base 100 completely.

As the user rotates the cover ring 300 counterclockwise by applying the rotational force of the predetermined magnitude or greater in a state in which the cover ring 300 is mounted on the base 100 completely, at least any one of the coupling protrusion 110 or the restriction projection 330 is elastically deformed, and the coupling protrusion 110 passes through the restriction projection 330, moves along the second coupling groove 320 and reaches the first coupling groove 310. In this way, the cover ring 300 may be removed from the base 100.

The restriction projection 330 may be disposed at a position at which the restriction projection 330 contacts the other side of the coupling protrusion 110 in the case in which one side of the coupling protrusion 110 of the cover ring 300 contacts the closed one end of the second coupling groove 320. The structure may be embodied by setting a distance from the restriction projection 330 to the closed one end of the second coupling groove 320 to be the same as or similar to the circumferencewise width of the coupling protrusion 110.

With this structure, the coupling protrusion 110 may remain pressed by a wall formed at the closed one end of the second coupling groove 320 and the restriction projection 330, in a state in which the cover ring 300 is coupled to the base 100 completely. Accordingly, both sides of the coupling protrusion 110 are restricted by the wall formed at the closed one end of the second coupling groove 320 and the restriction projection 330, is not easily rotated and remains mounted reliably. As the user rotates the cover ring 300 counterclockwise by applying the rotational force of the predetermined magnitude or greater as described above, the coupling protrusion 110 is released from restriction, and the cover ring 300 may be removed from the base 100.

With the above-described structure, the restriction projection 330 restricts the cover ring 300 effectively, to effectively prevent the cover ring 300 from being easily rotated by an unintended external force or being easily removed from the base 100. In this embodiment, the width of the second coupling groove 320 decreases as the second coupling groove 320 becomes far away from the first coupling groove 310, and the second coupling groove 320 has the restriction projection 330, such that the cover ring 300 remains coupled to the base 100 reliably.

Figure 15:
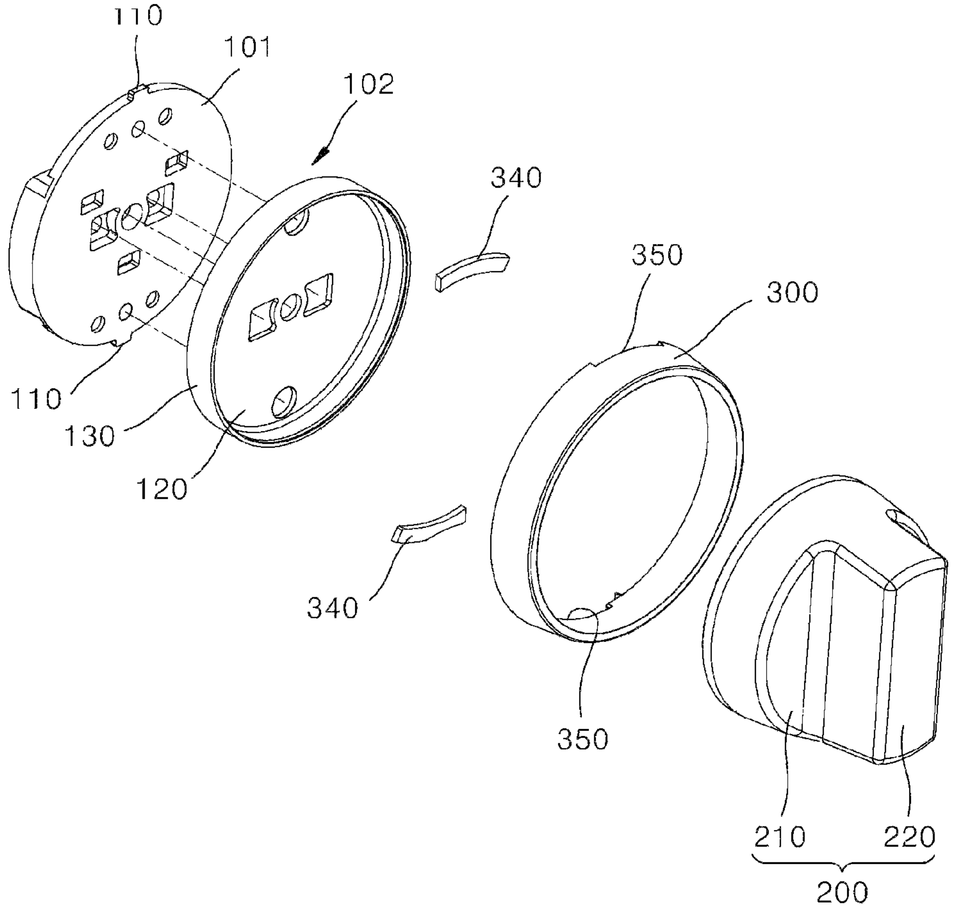
FIG. 15 is a perspective view of a control unit according to another embodiment.
Figure 16:
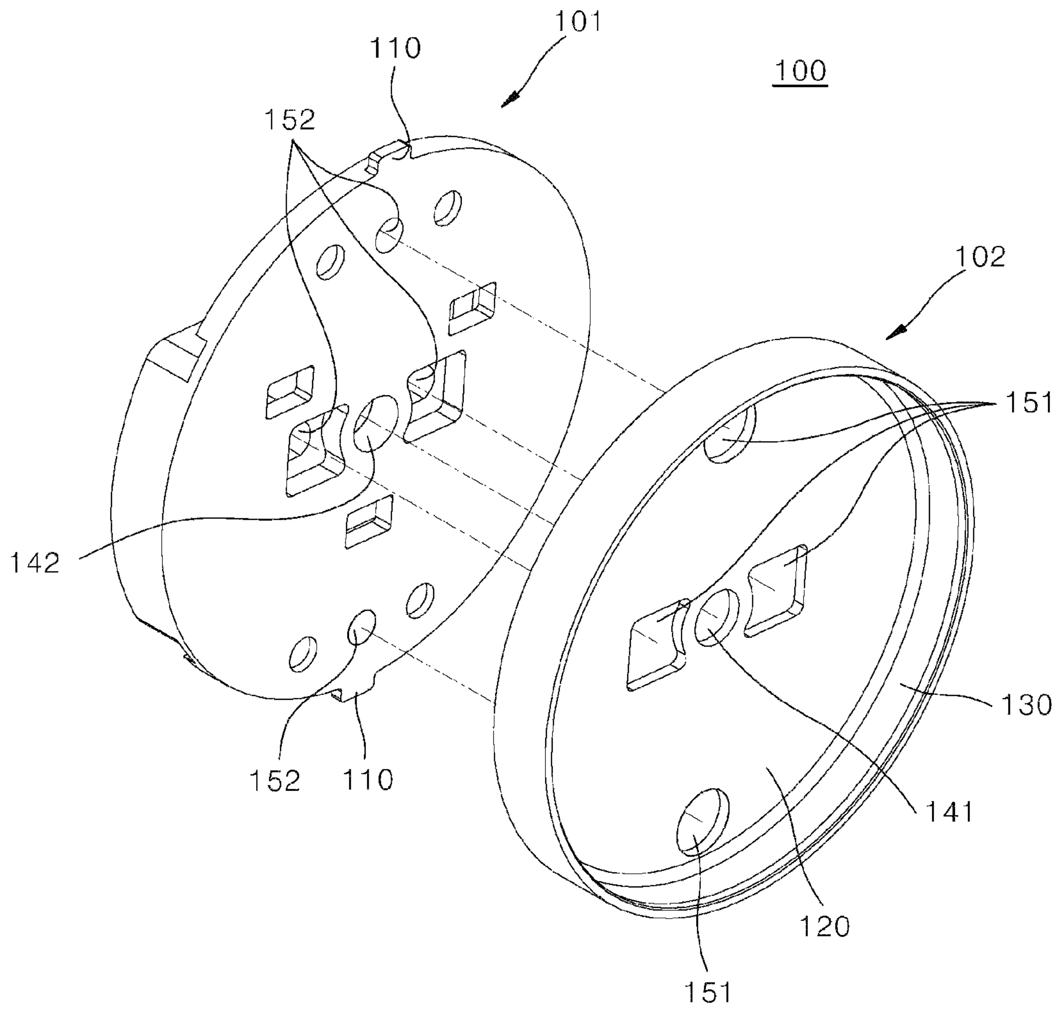
FIG. 16 is an enlarged view showing some components in FIG. 15.

FIG. 15 is a perspective view of a control unit according to another embodiment. FIG. 16 is an enlarged view showing some components in FIG. 15.

Base 100 may have a second part or portion 13 that protrudes at an edge of the base 100, on a front surface thereof, and may have a partially protruding portion that mounts at least a portion of the control unit to which rotational shaft 50 is coupled, on a rear surface thereof.

Thus, mostly, the base 100 may have a relatively complex structure. To manufacture the base 100 having the above structure readily, the base 100 may be include a plurality of pieces, that is, two pieces, and the two pieces may be coupled by a coupling tool, such as a screw nail, for example. As the base 100 is manufactured in such a way that the two separate pieces are coupled, the manufacturing costs of a relatively complex structure decrease.

Accordingly, the base 100 of the control unit 60 according to this embodiment may include a first piece 101 and a second piece 102 that are coupled to each other by a coupling tool. The first piece 101 may include a coupling protrusion 110. The second piece 102 may be mounted on the first piece 101 and provided with a first part or portion 120 and a second part or portion 130. Detailed structures of the coupling protrusion 110, the first part 120 and the second part 130 are described above.

In a state in which the front surface of the first piece 101 and the rear surface of the second piece 102 contact each other, the first piece 101 and the second piece 102 are coupled to each other by a coupling tool to be one base 100. Accordingly, a front surface of the first piece 101 and a rear surface of the second piece 102 may have an approximately planar surface such that they may be coupled to each other without an obstacle.

Each of the first piece 101 and the second piece 102 may have a hole to which a tool for coupling the first piece 101 and the second piece 102 is fastened, and may also have a hole for inserting rotational shaft 50.

More specifically, the first piece 101 may include a first insertion hole 141 and a first fastening hole 151. The first insertion hole 141 may be formed in a central portion of the first piece 101, and the rotational shaft 50 may be inserted into the first insertion hole 141. As the rotational shaft 50 needs to rotate smoothly with respect to the first piece 101, a diameter of the first insertion hole 141 may be greater than a diameter of the rotational shaft 50.

The first fastening hole 151 may be provided at a position spaced from the position of the first insertion hole 141, in multiple numbers, and a fastening tool may be inserted into the first fastening hole 151. A proper number of the first fastening holes 151 may be formed at proper positions to enable a reliable coupling of the base 100 to the control panel 40.

As the fastening tool is coupled to the first fastening hole 151, the entire control unit 60 including the base 100 may be mounted on the control panel 40. Additionally, the fastening tool may be coupled to the first fastening hole 151 and a second fastening hole 152 described hereinafter, such that the first piece 101 and the second piece 102 may be coupled to each other.

In response, the second piece 102 may include first insertion hole 141 of the first piece 101, second insertion hole 142 corresponding to the first fastening hole 151 and second fastening hole 152.

The second insertion hole 142 may be formed in a central portion of the second piece 102, to correspond to the first insertion hole 141, and the rotational shaft 50 may be inserted into the second insertion hole 142. For a smooth rotation of the rotational shaft 50, a diameter of the second insertion hole 142 may be greater than the diameter of the rotational shaft 50.

The second fastening hole 152 may be provided at a position spaced from the position of the second insertion hole 142, in multiple numbers, and formed to correspond to the first fastening hole 151, and a fastening tool may be inserted into the second fastening hole 152. The second fastening hole 152 may be provided at positions corresponding to the positions of the first fastening holes 151 of the second piece 102, in corresponding numbers.

A fastening tool may be fastened to the first fastening hole 151 and the second fastening hole 152, the first piece 101 and the second piece 102 may become one base 101, and the rotational shaft 50 may be provided to penetrate the first insertion hole 141 and the second insertion hole 142 together.

Embodiments disclosed herein provide a control unit and a cooking appliance comprising a control unit that has a structure readily disassembled by a user without an additional tool.

Embodiments disclosed herein provide a control unit and a cooking appliance comprising a control unit that has a structure readily attached and detached based on rotation and is provided with a cover ring.

Embodiments disclosed herein provide a control unit and a cooking appliance comprising a control unit that has a structure in which a cover ring remains coupled to another component reliably.

Advantages are not limited to the above ones, and other advantages that are not mentioned above may be clearly understood from the description and may be more clearly understood from the embodiments set forth herein. Additionally, advantages may be realized via means and combinations thereof that are described in the appended claims.

A control unit according to an embodiment may be provided to a cooking appliance and control an operation of the cooking appliance. The control unit may include a cover ring coupled to a base to surround the base. The cover ring may be mounted on the base by rotating in one or a first direction with respect to the base, and may be removed from the base by rotating in the opposite or a second direction with respect to the base. With this structure, the user may attach the cover ring to the base and detach the cover ring from the base manually without using an additional tool for attachment and detachment. Additionally, the user may attach the cover ring to the base and detach the cover ring from the base conveniently without separating a knob.

The cover ring may include a first coupling groove to which a coupling protrusion is coupled, and a second coupling groove a lengthwise direction of which is disposed in a circumferential direction of the cover ring and to which the coupling protrusion is coupled. The second coupling groove may have a width that decreases gradually in a direction in which the second coupling groove extends away from the first coupling groove, such that the cover ring is coupled to the base tightly, making it possible for the cover ring to remain coupled to the base reliably.

The cover ring may include a restriction projection that is formed in such a way that the restriction projection protrudes from the inner wall of the cover ring and restricts movement of the coupling protrusion from the second coupling groove. As the cover ring is mounted on the base completely, the coupling protrusion may be pressed by the restriction projection and one end of the second coupling groove, which is closed. Accordingly, the cover ring may be coupled to the base tightly, making it possible for the cover ring to remain coupled to the base reliably.

The cover ring may include a mounting piece that covers an open portion of the second coupling groove, and a mounting groove in which the mounting piece is mounted. Accordingly, the second coupling groove may be formed at the cover ring in such a way that one side of the second coupling groove is open, and the open portion may be covered by the mounting groove. With this structure, the second coupling groove with both sides closed may be readily formed at the cover ring.

A control unit according to an embodiment may include a base coupled to the cooking appliance, a knob rotatably disposed at the base, and a cover ring coupled to the base to surround the base. The cover ring may be mounted on the base by rotating in one or a first direction with respect to the base, and may be removed from the base by rotating in the opposite or a second direction with respect to the base.

The knob may include a body disposed inside of the cover ring and surrounded by the cover ring, and a handle configured to protrude from the body and provided in a bar shape. The base may have at least one coupling protrusion that protrudes from an edge of the base outward and to which the cover ring is coupled.

The cover ring may include a first coupling groove which is formed on an inner wall of the cover ring, one end of which is open, and to which the coupling protrusion is coupled, and a second coupling groove which is formed on the inner wall of the cover ring in such a way that the second coupling groove connects to the first coupling groove, a lengthwise direction of which is disposed in a circumferential direction of the cover ring, and to which the coupling protrusion is coupled. The second coupling groove may have a width that decreases gradually in a direction in which the second coupling groove extends away from the first coupling groove.

The cover ring may include a restriction projection that is formed at a position of the cover ring, where the second coupling groove is formed, in such a way that the restriction projection protrudes from the inner wall of the cover ring, and that suppresses movement of the coupling protrusion from the second coupling groove. The restriction projection may be disposed at a position at which the restriction projection contacts the other side of the coupling protrusion in the case in which one side of the coupling protrusion of the cover ring contacts one end of the second coupling groove, which is closed.

A pair of coupling protrusions may be provided in such a way that the coupling protrusions are disposed symmetrically with respect to a center of the base, and a pair of the first coupling grooves and a pair of the second coupling grooves may be provided at each of the pair of coupling protrusions in such a way that the first coupling grooves and the second coupling grooves respectively are disposed symmetrically with respect to a center of the cover ring.

The cover ring may include a mounting piece that is mounted in a position where the mounting piece overlaps at least a portion of the second coupling groove and covers an open portion of the second coupling groove, and a mounting groove which is formed at a position at which the mounting groove overlaps at least a portion of the second coupling groove in such a way that the mounting groove is depressed and on which the mounting piece is mounted.

The cover ring may include a guide groove that is formed in such a way that an outer surface of the guide groove is depressed, and guides a rotational angle of the cover ring in a case in which a user contacts the cover ring. In a case in which the cover ring is mounted on the base completely, the guide groove may be disposed at a lowermost position of the cover ring.

The base may include a first part or portion provided to have a disc shape, and a second part or portion configured to protrude at an edge of the first part in a ring shape, surrounded by the cover ring, and configured to surround at least a portion of the knob.

The base may include a shaft insertion hole which is formed in a central portion of the first part and into which a rotational shaft is inserted, and a tool fastening hole which is provided in multiple numbers at a position of the first part, spaced from the shaft insertion hole, and into which a fastening tool is inserted.

The base may include a first piece configured to have the coupling protrusion, and a second piece mounted on the first piece and provided with the first part and the second part. The first piece may include a first insertion hole which is formed in a central portion of the first piece and into which the rotational shaft is inserted, and a first fastening hole which is provided at a position spaced from the first insertion hole in multiple numbers and into which a fastening tool is inserted.

The second piece may include a second insertion hole which is formed in a central portion of the second piece to correspond to the first insertion hole and into which the rotational shaft is inserted, and a second fastening hole which is provided at a position spaced from the second insertion hole, in multiple numbers and formed to correspond to the first fastening hole, and into which a fastening tool is inserted. The cover ring may be mounted on the base in such a way that the cover ring is independent from the knob, and removed from the base.

A cooking appliance according to an embodiment may include a control panel, and a control unit provided to the control panel. The control unit may include a base coupled to the cooking appliance, a knob rotatably disposed at the base, and a cover ring coupled to the base to surround the base. The base may have at least one coupling protrusion that protrudes from an edge of the base outward and to which the cover ring is coupled, and the cover ring may include a first coupling groove which is formed on an inner wall of the cover ring, one end of which is open, and to which the coupling protrusion is coupled, and a second coupling groove which is formed on the inner wall of the cover ring in such a way that the second coupling groove connects to the first coupling groove, a lengthwise direction of which is disposed in a circumferential direction of the cover ring, and to which the coupling protrusion is coupled.

The second coupling groove may have a width that decreases gradually in a direction in which the second coupling groove extends away from the first coupling groove, and the cover ring may include a restriction projection that is formed at a position of the cover ring, where the second coupling groove is formed, in such a way that the restriction projection protrudes from the inner wall of the cover ring, and that suppresses movement of the coupling protrusion from the second coupling groove.

In the control unit and the cooking appliance comprising the control unit, according to embodiments disclosed herein, the cover ring may be mounted on the base by rotating in one direction with respect to the base, and may be removed from the base by rotating in the opposite direction with respect to the base, such that the user may attach the cover ring to the base and detach the cover ring from the base readily by rotating the cover ring manually, without using an additional tool for attachment and detachment.

In the control unit and the cooking appliance comprising the control unit, according to embodiments disclosed herein, the user may attach the cover ring to the base and detach the cover ring from the base readily, without separating the knob. Thus, the knob may be attached to and detached from another portion of the control unit, promoting user convenience.

In the control unit and the cooking appliance comprising the control unit, according to embodiments disclosed herein, the width of the second coupling groove may decrease gradually in a direction in which the second coupling groove extends away from the first coupling groove, and the second coupling groove may have the restriction projection, making it possible for the cover ring to remain coupled to the base reliably.

Specific effects are described along with the above-described effects, in the section of detailed description.

Embodiments are described with reference to a number of illustrative embodiments thereof. However, embodiments are not limited to the embodiments and drawings set forth herein, and numerous other modifications and embodiments can be drawn by one skilled in the art within the technical scope. Further, the effects and predictable effects based on the configurations in the disclosure are to be included within the range of the disclosure though not explicitly described in the description of the embodiment.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control unit for a cooking appliance, comprising:

a base configured to be coupled to the cooking appliance;

a knob rotatably disposed at the base; and a cover ring coupled to the base to surround the base, wherein the cover ring is mounted on the base by rotating the cover ring in a first direction with respect to the base, and is removed from the base by rotating the cover ring in a second direction, which is an opposite direction to the first direction, wherein the base has at least one coupling protrusion that protrudes outwardly from an edge of the base and to which the cover ring is coupled, wherein the cover ring comprises:

a first coupling groove, which is formed on an inner wall of the cover ring, a first end of which is open, and to which the at least one coupling protrusion is coupled; and a second coupling groove, which is formed on the inner wall of the cover ring, which connects to the first coupling groove, a lengthwise direction of which is disposed in a circumferential direction of the cover ring, and to which the at least one coupling protrusion is coupled, and wherein the cover ring comprises a restriction projection that is formed at a position of the cover ring at which the second coupling groove is formed, wherein the restriction projection protrudes from the inner wall of the cover ring, and wherein the restriction projection suppresses movement of the at least one coupling protrusion at the second coupling groove.

2. The control unit of claim 1, wherein the knob comprises:

a body disposed inside of the cover ring and surrounded by the cover ring; and a handle that protrudes from the body and provided in a bar shape.

3. The control unit of claim 1, wherein a width of the second coupling groove decreases gradually in a direction in which the second coupling groove extends away from the first coupling groove.

4. The control unit of claim 1, wherein the at least one restriction projection is disposed at a position at which the restriction projection contacts a second side of the coupling protrusion in a case in which a first side of the at least one coupling protrusion of the cover ring contacts a first end of the second coupling groove, which is closed.

5. The control unit of claim 1, wherein the at least one coupling protrusion comprises a pair of coupling protrusions disposed symmetrically with respect to a center of the base, and wherein a pair of the first coupling grooves and a pair of the second coupling grooves are provided at each of the plurality of coupling protrusions in such a way that the pair of first coupling grooves and the pair of second coupling grooves are, respectively, disposed symmetrically with respect to a center of the cover ring.

6. The control unit of claim 1, wherein the cover ring comprises:

a mounting piece mounted in a position at which the mounting piece overlaps at least a portion of the second coupling groove and covers an open portion of the second coupling groove; and a mounting groove formed at a position at which the mounting groove overlaps at least a portion of the second coupling groove, wherein the mounting groove is depressed and the mounting piece is mounted on the mounting groove.

7. The control unit of claim 1, wherein the cover ring comprises a guide groove, wherein an outer surface of the guide groove is depressed, and wherein the guide groove guides a rotational angle of the cover ring in a case in which a user contacts the cover ring.

8. The control unit of claim 7, wherein in a case in which the cover ring is mounted on the base completely, the guide groove is disposed at a lowermost position of the cover ring.

9. The control unit of claim 1, wherein the base comprises:

a first portion having a disc shape; and a second portion configured to protrude at an edge of the first portion in a ring shape, surrounded by the cover ring, and configured to surround at least a portion of the knob.

10. The control unit of claim 9, wherein the base comprises:

a shaft insertion hole which is formed at a central portion of the first portion and into which a rotational shaft is inserted; and a plurality of tool fastening holes provided at positions of the first portion, spaced from the shaft insertion hole, and configured to receive a fastening tool inserted thereinto.

11. The control unit of claim 9, wherein the base comprises:

a first piece configured to have the at least one coupling protrusion; and a second piece mounted on the first piece and provided with the first portion and the second portion.

12. The control unit of claim 11, wherein the first piece comprises:

a first insertion hole which is formed in a central portion of the first piece and into which a rotational shaft is inserted; and a plurality of first fastening holes provided at positions spaced from the first insertion hole and configured to receive a fastening tool inserted thereinto.

13. The control unit of claim 12, wherein the second piece comprises:

a second insertion hole which is formed in a central portion of the second piece to correspond to the first insertion hole and into which the rotational shaft is inserted; and a plurality of second fastening holes provided at positions spaced from the second insertion hole, formed to correspond to the plurality of first fastening holes, and configured to receive a fastening tool inserted thereinto.

14. The control unit of claim 1, wherein the cover ring is mounted on the base in such a way that the cover ring is independent from the knob, and wherein the cover ring is configured to be removed from the base.

15. A cooking appliance comprising the control unit of claim 1.

16. A cooking appliance comprising a control panel and a control unit provided at the control panel, comprising:

the control unit, comprising:

a base coupled to the cooking appliance;

a knob rotatably disposed at the base; and a cover ring coupled to the base to surround the base, wherein the base includes at least one coupling protrusion that protrudes from an edge of the base outward and to which the cover ring is coupled, wherein the cover ring comprises:

a first coupling groove, which is formed on an inner wall of the cover ring, a first end of which is open, and to which the at least one coupling protrusion is coupled; and a second coupling groove, which is formed on the inner wall of the cover ring, which connects to the first coupling groove, a lengthwise direction of which is disposed in a circumferential direction of the cover ring, and to which the at least one coupling protrusion is coupled, wherein the cover ring comprises a restriction projection that is formed at a position of the cover ring at which the second coupling groove is formed, wherein the restriction projection protrudes from the inner wall of the cover ring, and wherein the restriction projection suppresses movement of the at least one coupling protrusion at the second coupling groove.

17. The cooking appliance of claim 16, wherein a width the second coupling groove decreases gradually in a direction in which the second coupling groove extends away from the first coupling groove.

* * * * *